UNITED STATES PATENT OFFICE.

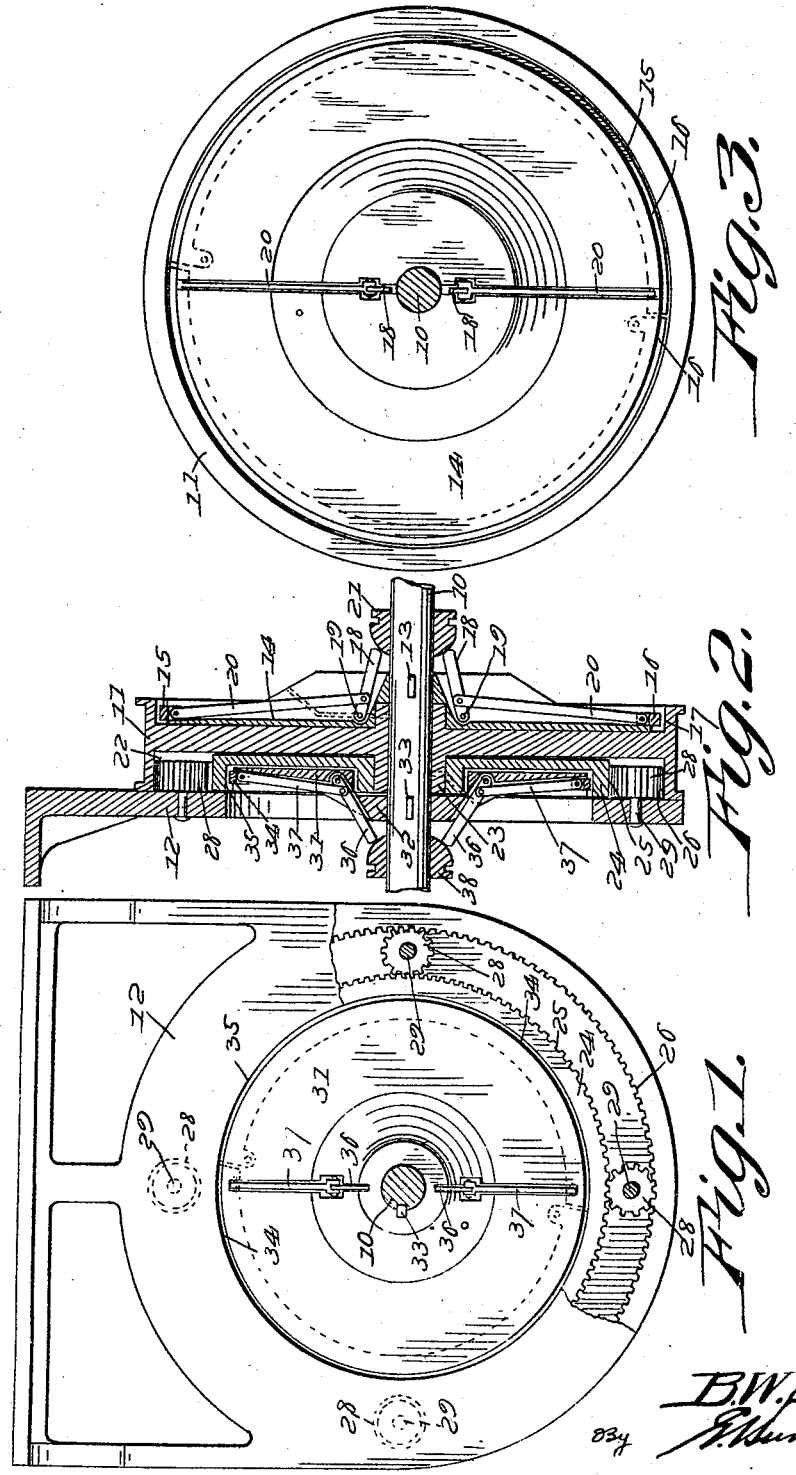

BERNARD W. SMITH, OF BRADFORD, VERMONT.

REVERSE PULLEY FOR MACHINE TOOLS, ELEVATORS, ETC.

1,420,502.  Specification of Letters Patent. Patented June 20, 1922.

Application filed June 2, 1920. Serial No. 385,911.

*To all whom it may concern:*

Be it known that I, BERNARD W. SMITH, a citizen of United States, residing at Bradford, in the county of Orange and State of Vermont, have invented new and useful Improvements in Reverse Pulley for Machine Tools, Elevators, etc., of which the following is a specification.

The object of the invention is to provide a reversing pulley for effecting the movements in opposite directions and preferably at different rates of speed of the driven elements, through power received from a driving element such as a shaft or the equivalent thereof, to the end that a reversal in the direction of movement or the variation in the speed of movement may be readily controlled by the operator through means acting directly between the driving and driven elements, and also through a mechanism which is compactly arranged and therefore is not subject to disarrangement by contact with adjacent objects, and which will occupy a minimum of space in the top or in the vicinity of the machine to be driven; and with these objects in view the invention consists of the construction and combination of parts, a preferred embodiment of which is shown in the drawings, wherein:

Figure 1, is a side view of the apparatus partly broken away to show interior construction.

Figure 2, is a diametrical sectional view of same.

Figure 3, is an elevation of the opposite side of the device from that shown in Figure 1.

In the illustrated embodiment of the invention, the driving element 10 is represented as a shaft adapted to receive continuous motion in one direction from any suitable source of power, while the driven element 11 is represented as a pulley attached for example to a belt for the purpose of communicating motion to machinery of an elevator or other vehicle to be driven, and when as indicated in the drawings the device is intended for use in driving machinery which at intervals must be reversed in motion and which for example should be driven in one direction at a relatively rapid and in the opposite direction at a relatively slow rate of speed, provision is made in the way of a pendent bracket 12 depending for example from the ceiling or an overhead timber, to support the pulley and means for communicating the motion thereto from the shaft which latter may be supported in any suitable relation to the motive power.

Mounted upon the shaft or driving member and keyed thereto, as shown at 13 is a disk 14 preferably arranged in a recess 15 in the side of the pulley or driven member and carrying followers 16 disposed peripherally to the disk and adapted for radial movement and for contact with an annular rim or shoulder 17 of the driven member, motion being communicable to the followers and rims by levers 18 fulcrumed at 19 and connected to the followers by links 20 the free ends of said levers being arranged in the path of movement of a spreading cone 21 slidably mounted upon the shaft and movable by any suitable lever or equivalent shifting means. Obviously when the spreader 21 is brought into operative relation with the terminals of the levers 18, the latter are spread to correspondingly extend the followers into engaging relation with the rim or shoulder 17 to the end that the driven member is locked with the driving member and receives motion therefrom at the same rate of speed.

In the reverse side of the driven member there is formed a recess 22 in which and upon the hub 23 of the pulley, there is mounted a revolvable disk or equivalent loose member 24 of which the periphery is toothed as indicated at 25, correspondingly internally geared member 26 being formed on a flange or rim 27 of the driven member, and pinions 28 being interposed between the external gear teeth of the loose disk and the internal gear teeth of the driven member and having their spindles 29 carried by the bracket 12 or any equivalent stationary support.

Seated in an annular recess of the loose gear is a fast disk 31 of which the hub 32 is keyed as shown at 33 to the driving member or shaft, but said fast disk carries followers 34 adapted for engagement with an internal rim or shoulder 35 on the loose disk and the followers are actuatable by levers 36 operatively connected with them by links 37 said levers 36 being terminally arranged in the path of a spreading cone 38 mounted slidably upon the shaft 10. Therefore, when the spreader 38 is moved in engaging relation with the free ends of the levers 36 and the followers 34 are extended into engagement with the rim or shoulder of the loose disk 24, the latter is locked to the driving shaft and thus communicates motion through the pinions 28 to the rim of the driven member which imparts to the latter a motion which is the reverse of that communicated by the mechanism including the fast disk 14, and at a lower rate of speed determined by the loose disk 24 with respect to the internally toothed member 26.

Hence by moving one or the other of the spreaders into engaging relation with its respective follower and operating levers, the driven member may be actuated either directly by the driving shaft in one direction or through the speed reducing gear in the opposite direction, it being obvious that such relative movements of the driven member are adapted to the operation of planers, sawing machines and the like wherein relatively slow forward movement is required as distinguished from a relatively rapid opposite or return movement preparatory to a succeeding working movement.

The invention having been described, what is claimed as new and useful is:—

1. A motion transmitting mechanism having driving and driven members consisting respectively of a shaft and a pulley in combination with fast elements carried by the shaft and provided with radially movable followers and a loose disk revolvably mounted concentric with the pulley, said loose disk and the pulley being provided with rims or shoulders for respective engagement by the followers of said fast elements, pinions interposed between external and internal gears respectively carried by said loose element and the pulley, and means for respectively actuating the followers of said fast elements.

2. A motion transmitting mechanism having driving and driven members consisting respectively of a shaft and a pulley loosely mounted on the shaft, in combination with a pair of disks disposed on opposite sides of the pulley and fixedly secured to the shaft, one of said disks being disposed in a recess on one side of the pulley, followers carried by the said latter disk and disposed for movement into engagement with an overhanging flange constituting a part of the pulley, levers pivoted to said disk, links operatively connecting the levers with the followers, a revolvable disk interposed between the other of said fixed disks and the pulley and provided with peripheral teeth, pinions having fixed axes of rotation meshing with the teeth of said disks and also meshing with teeth formed in the inner periphery of the overhanging flange of the pulley, followers carried by said other fixed disk and adapted for movement into engagement with the revolvable disk, levers pivotally mounted on said other fixed disk, links operatively connecting the last said levers with the last said followers and spreading cones carried on the shaft for longitudinal movement thereon to coact with the levers on the two disks to alternately effect the operation of the followers for the purpose specified.

In testimony whereof he affixes his signature.

BERNARD W. SMITH.